(12) United States Patent  
Mizuno

(10) Patent No.: US 11,808,329 B2  
(45) Date of Patent: Nov. 7, 2023

(54) BALL SCREW MECHANISM AND LINEAR MOVING DEVICE

(71) Applicant: Hayato Mizuno, Kanagawa (JP)

(72) Inventor: Hayato Mizuno, Kanagawa (JP)

( * ) Notice: Subject to any disclaimer, the term of this patent is extended or adjusted under 35 U.S.C. 154(b) by 98 days.

(21) Appl. No.: 17/595,483

(22) PCT Filed: May 29, 2019

(86) PCT No.: PCT/JP2019/021390  
§ 371 (c)(1),  
(2) Date: Nov. 17, 2021

(87) PCT Pub. No.: WO2020/240743  
PCT Pub. Date: Dec. 3, 2020

(65) Prior Publication Data  
US 2022/0260140 A1  Aug. 18, 2022

(51) Int. Cl.  
*F16H 25/20* (2006.01)  
*F16H 25/22* (2006.01)

(52) U.S. Cl.  
CPC ................ *F16H 25/2233* (2013.01)

(58) Field of Classification Search  
CPC ............. F16H 25/22; F16H 25/2233; F16H 2025/228; F16H 25/2247  
See application file for complete search history.

(56) References Cited

U.S. PATENT DOCUMENTS

| 4,693,131 A | 9/1987 | Teramachi |
| 2002/0164095 A1 | 11/2002 | Nagai et al. |

(Continued)

FOREIGN PATENT DOCUMENTS

| DE | 102017206583 A1 * | 10/2018 | ............ F16C 29/063 |
| JP | 56-113253 U | 9/1981 | |

(Continued)

OTHER PUBLICATIONS

International Search Report issued in International Application No. PCT/JP2019/021390, dated Aug. 13, 2019, 4 pages w/ translation.

(Continued)

*Primary Examiner* — Zakaria Elahmadi  
(74) *Attorney, Agent, or Firm* — Hamre, Schumann, Mueller & Larson, P.C.

(57) ABSTRACT

There is provided a ball screw mechanism for which a return of a sphere, such as a conventional circulating ball screw, need not to be considered, and that can prevent vibration and noise and avoid an increase in heat by ensuring smooth movement of a sphere without causing ball jam or the like of a sphere on a screw shaft. The present invention includes a screw shaft 2 that has a spiral groove 2a and extends linearly, a housing 30 that surrounds a periphery of the screw shaft 2, and a plurality of spheres 4 and ball bearings 5 that transmits thrust of the screw shaft 2 to the housing 30. Each ball bearing 5 includes an outer ring 7 attached and fixed to the housing 30 at regular intervals along the spiral groove 2a of the screw shaft 2, and an inner ring 6 provided with a concave spherical contact surface 5a in contact with the sphere 4 on a side surface facing the screw shaft 2. Each inner ring 6 is rotatably disposed about rotation axes $N_1$ to $N_4$ orthogonal to a rotation axis O of the screw shaft 2. The spheres 4 are arranged, each in contact with the contact surface 5a of each of the ball bearings 5, at regular intervals adjacent to each other in the spiral groove 2a of the screw shaft 2.

7 Claims, 13 Drawing Sheets

(56) References Cited

U.S. PATENT DOCUMENTS

| | | | |
|---|---|---|---|
| 2014/0338487 A1* | 11/2014 | Yamada | F16H 25/2247 74/424.91 |
| 2017/0335933 A1 | 11/2017 | Fujii et al. | |
| 2019/0097492 A1* | 3/2019 | Matsuto | F16H 25/2015 |

FOREIGN PATENT DOCUMENTS

| | | | | |
|---|---|---|---|---|
| JP | 56-147956 | | 11/1981 | |
| JP | 63-187720 | U | 12/1988 | |
| JP | 4-070505 | B | 11/1992 | |
| JP | 11-514076 | | 11/1999 | |
| JP | 2000-326857 | | 11/2000 | |
| JP | 2002-327741 | | 11/2002 | |
| JP | 2010-048275 | | 3/2010 | |
| JP | 2011-112128 | | 6/2011 | |
| JP | 2015-096752 | | 5/2015 | |
| JP | 2016-114181 | | 6/2016 | |
| JP | 2016-125661 | | 7/2016 | |
| WO | WO-9808007 | A1 * | 2/1998 | F16H 25/22 |
| WO | 2008-013150 | | 1/2008 | |

OTHER PUBLICATIONS

Office Action issued in Japanese Patent Application No. 2019-532814, dated Apr. 3, 2020, 10 pages w/translation.

* cited by examiner

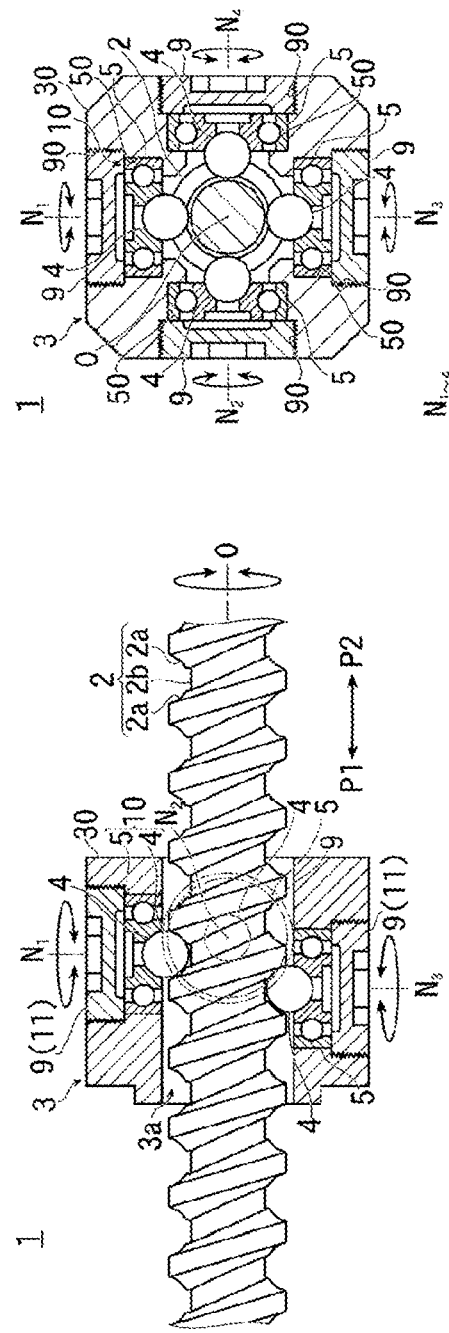
FIG. 1A
FIG. 1B
FIG. 1C
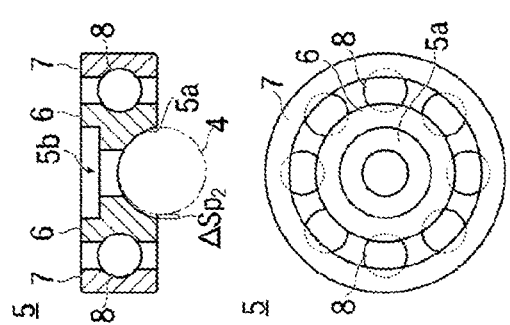
FIG. 1D

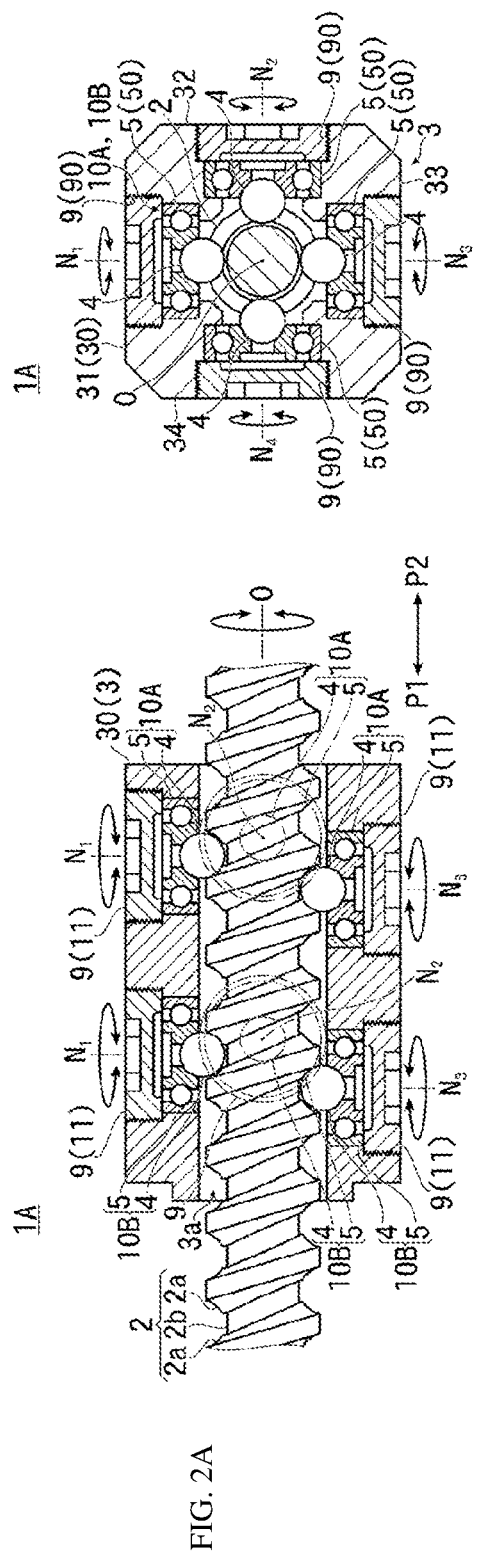

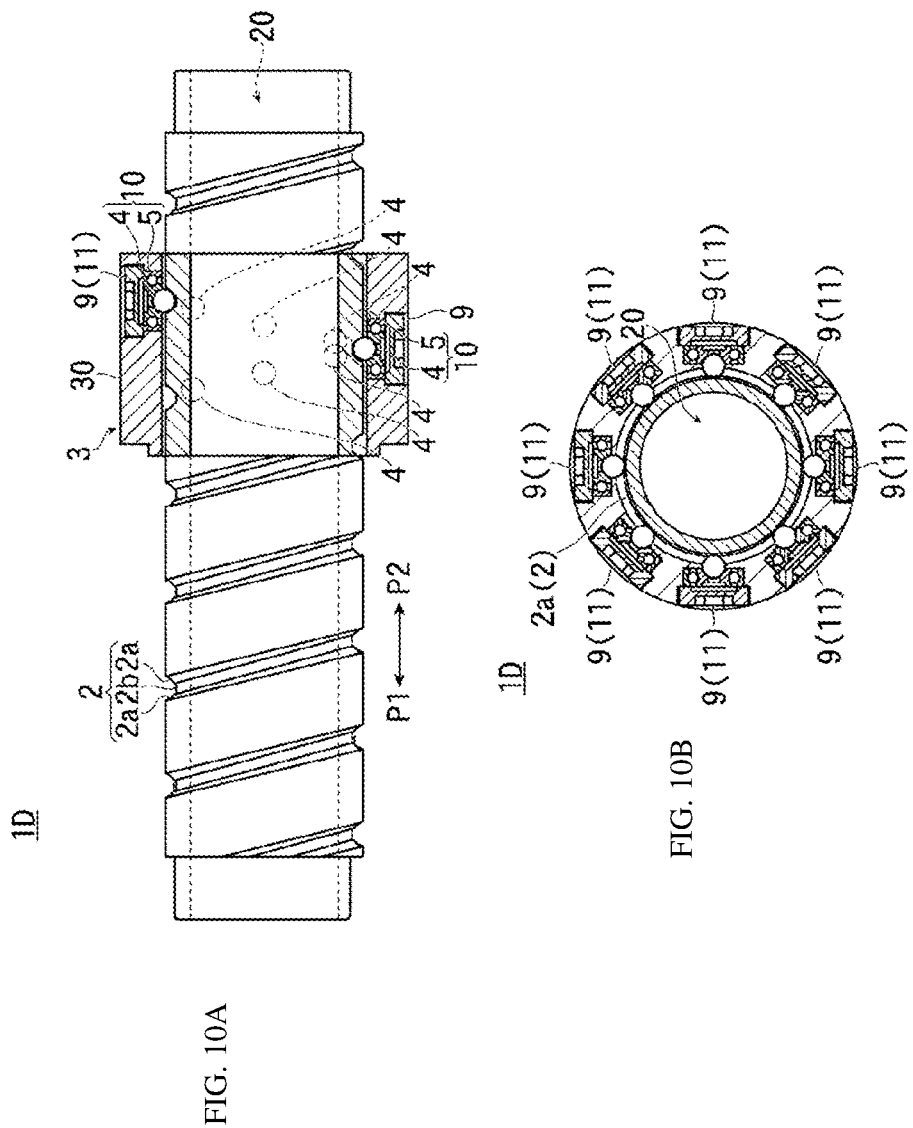

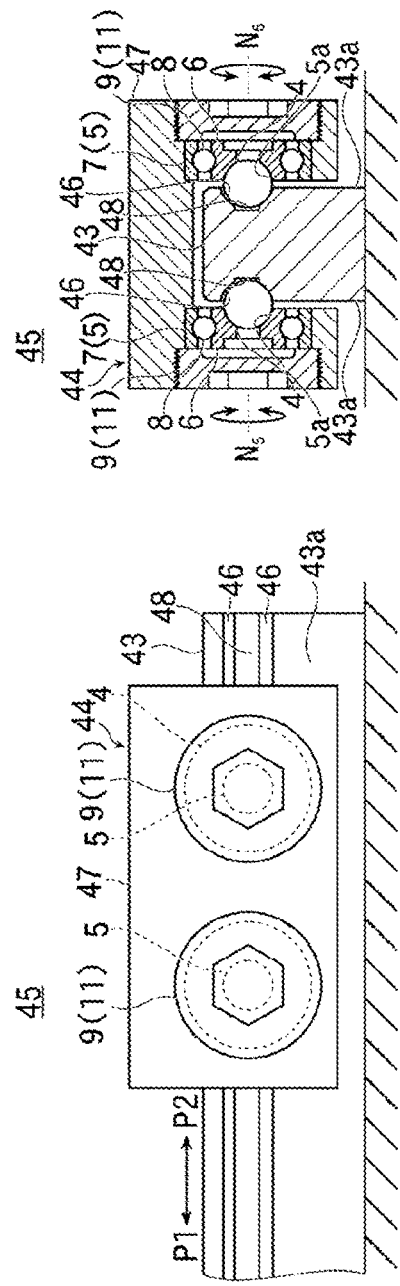

BALL SCREW MECHANISM AND LINEAR MOVING DEVICE

TECHNICAL FIELD

The present invention relates to a technique of a ball screw mechanism using a screw shaft and a sphere.

BACKGROUND ART

Conventionally, various ball screws are known.

For example, there are a non-circulating type in which a sphere is fixed to a slide bearing provided in a nut and moves the nut while rolling on a screw shaft, and a circulating type in which a large number of spheres are wound around a screw shaft 1.5 to 3.5 times in a ball nut on a ball screw shaft, the spheres sent to a nut outlet are returned to an original nut inlet by a guide such as a pipe or a return groove, and the spheres are circulated in the nut.

However, the conventional circulating ball screws have various problems as described below, which have not been solved at present.

For example, when a sphere is returned to a pipe or the like to circulate, there has been a problem of getting caught on the way or riding of the sphere due to biting behaviors of the sphere at a time of drive reversal.

In particular, in a circulating ball screw that performs high-speed rotation, fluctuations in loads of a sphere are large, and a problem of clogging in a return pipe occurs.

In addition, when it is necessary to reduce backlash due to use of a servo motor or the like, it is necessary, in order to eliminate backlash of a large number of spheres in one nut, to remove gaps between the spheres and track grooves as much as possible and put the spheres in close contact with each other. Thus, in some cases, a group of oversized spheres are incorporated.

As a result, smooth return of the spheres is hindered, and the spheres beat each other to cause an increase in vibration, noise, and heat, which also hinders the smooth return of the spheres.

Further, in the conventional circulating ball screws, collisions between spheres are structurally difficult to be avoided. In particular, in order to reduce backlash or increase rigidity of a ball screw, when a preload is applied in a ball screw using a nut incorporating a group of oversized spheres or a pair of nuts axially displaced from each other, the spheres are strongly pressed against each other, and a rotation direction of a contact surface of the spheres is relatively reversed, thereby causing a loss. For this reason, a decrease in power transmission efficiency is unable to be avoided.

In order to prevent this problem, conventionally bearings incorporating retainers have been devised, but unlike general bearings, there is a difficult problem that structures become complicated because of returns of spheres.

In addition, when the load turns (the number of turns of a sphere) increases, a pitch error also cumulates and increases accordingly, so that a bias occurs in a load sharing ratio of a sphere, and it is very difficult to suppress the bias.

Furthermore, in the conventional circulating ball screws, a frame of a nut is made of alloy steel having high strength, hardness of a ball track is around HRC 60, and depth distribution of hardness has to withstand strength of a contact stress with a sphere (hardness of a steel ball is HRC 60 or more).

CITATION LIST

Patent Literature

Patent Literature 1: JP 2015-96752 A
Patent Literature 2: JP 2016-114181 A
Patent Literature 3: JP 2016-125661 A

SUMMARY OF INVENTION

Technical Problem

The present invention has been made in view of such problems of conventional techniques, and an object of the present invention is to provide a ball screw mechanism for which a return of a sphere, such as a conventional circulating ball screw, need not to be considered, and that can prevent vibration and noise and avoid an increase in heat by ensuring smooth movement of a sphere without causing ball jam or the like of a sphere on a screw shaft.

Another object of the present invention is to provide a ball screw mechanism that can improve power transmission efficiency by avoiding contact between spheres on a screw shaft and suppressing a power transmission loss during operation.

In addition, another object of the present invention is to provide a ball screw mechanism that can reduce the load turn of a sphere on a screw shaft and reduce an accumulated pitch error to prevent a bias in a load distribution ratio of a sphere.

Furthermore, another object of the present invention is to provide a compact, lightweight, and inexpensive ball screw mechanism that can reduce a value of backlash without using a highly accurate member.

Solution to Problem

The present invention made to solve the above problems is a ball screw mechanism comprising: a screw shaft that includes a spiral groove and extends linearly; a moving body that includes a housing provided so as to surround a periphery of the screw shaft; and a power transmission mechanism that transmits thrust of the screw shaft to the housing of the moving body to move the moving body in an axial direction of the screw shaft, wherein the power transmission mechanism includes a plurality of ball bearings and a plurality of spheres respectively corresponding to the ball bearings, and the ball bearings each include, with one side surface facing the screw shaft, an outer ring attached and fixed to the housing of the moving body at regular intervals along the spiral groove of the screw shaft, and an inner ring with a concave spherical contact surface formed on a side surface facing the screw shaft, the concave spherical contact surface being in contact with the spheres and each of the inner rings is rotatably disposed about a rotation axis in a direction orthogonal to a rotation axis of the screw shaft, and the spheres are arranged, each in contact with the contact surface, at regular intervals adjacent to each other in the spiral groove of the screw shaft, and the bottom part of the spiral groove of the screw shaft has a groove to avoid contact with the spheres.

The present invention is also effective when the screw shaft has a hollow structure.

The present invention is also effective when a plurality of the power transmission mechanisms is included, and a distance in a direction of the screw shaft between a pair of corresponding spheres of the power transmission mechanisms is set to be a value obtained by subtracting a value corresponding to backlash with thrust from the spheres acting on the screw shaft, from a value equivalent to a number of pitches between the spiral grooves of the screw shaft on which the pair of spheres is arranged.

The present invention is also effective when three or more of the ball bearings and the spheres are provided per lead of the screw shaft.

Further, the present invention is a linear moving device comprising: any one of the ball screw mechanisms described above; a pair of support blocks that rotatably supports the screw shaft of the ball screw mechanism; a table that is attached to the housing of the ball screw mechanism; and a linear motion mechanism that includes a pair of guide rails arranged in parallel with the screw shaft of the ball screw mechanism and moving blocks attached to the table and mounted on the guide rails to respectively move linearly along the guide rails.

The present invention is also effective when in the linear motion mechanism, the guide rail has a guide groove extending linearly along the guide rail and the moving blocks include a housing provided so as to face both side surfaces of the guide rail, the ball bearings each are attached, with one side surface facing the guide groove of the guide rail, to the housing of the moving blocks along the guide groove of the guide rail, and the guide groove has a cross-section formed in an arc shape or a Gothic arch shape, and the ball bearings each include, with one side surface facing the guide rail, an outer ring attached and fixed to the housing of the moving blocks at regular intervals along the guide groove, and an inner ring with a concave spherical contact surface formed on a side surface facing the guide rail, the concave spherical contact surface being in contact with the spheres, and each of the inner rings is rotatably disposed about a rotation axis in a direction orthogonal to a longitudinal direction of the guide rail and the spheres are arranged, each in contact with the contact surface, at predetermined intervals adjacent to each other in the guide groove of the guide rail.

Advantageous Effects of Invention

In the case of the present invention, a plurality of spheres is arranged in a spiral groove of a screw shaft, each in contact with a concave spherical contact surface of an inner ring of a plurality of ball bearings each, provided in a housing of a moving body, and when the screw shaft is rotated about a rotation axis, the sphere is pushed by thrust and rotational torque generated at a contact portion between the spiral groove of the screw shaft and a sphere surface and at a contact portion between a contact surface of the inner ring of the ball bearing and the sphere surface to roll on the spiral groove of the screw shaft, the surface of the sphere is in contact with the contact surface of the inner ring of the ball bearing in a small elliptical area, the inner ring of each ball bearing rotates about a rotation axis N in a direction orthogonal to the rotation axis of the screw shaft by a frictional force generated on the contact surface of the inner ring of the ball bearing, and the spiral groove of the screw shaft advances in an axial direction of the screw shaft on a principle of a screw.

As a result, an outer ring of the ball bearing attached and fixed to the housing of the moving body along the spiral groove of the screw shaft receives a thrust component in a direction of the rotation axis of the screw shaft via a ball of the ball bearing, and the thrust component is transmitted to the housing of the moving body via the ball bearing, thereby causing the moving body to move in the direction of the rotation axis of the screw shaft.

As described above, the present invention does not have a mechanism for returning and circulating a sphere such as a conventional circulating ball screw, and thus, it is possible to ensure smooth movement of a sphere without occurrence of ball jam or the like on a screw shaft when a sphere returns, which has occurred in a conventional circulating ball screw.

In addition, in the case of the present invention, since the spheres are arranged, each in contact with the contact surface of the inner ring of the ball bearing, at regular intervals adjacent to each other in the spiral groove of the screw shaft, the spheres do not come into contact with each other on the screw shaft.

As a result, according to the present invention, it is possible to prevent vibration and noise caused by the contact between the spheres generated in a conventional circulating ball screw, to avoid an increase in heat, and to suppress a power transmission loss during operation caused by the contact between the spheres on the screw shaft, so that power transmission efficiency can be improved.

Furthermore, in the present invention, for example, three or more of the ball bearings and the spheres can be provided per lead of the screw shaft, that is, if using terms of a conventional circulating ball screw, the number of turns of the sphere on the screw shaft can be one turn.

As a result, according to the present invention, since the number of turns of the sphere can be reduced, an accumulated pitch error generated in a conventional circulating ball screw can be reduced, and a load sharing ratio of the sphere can be prevented from being biased.

In addition, in the present invention, by using a sphere having a diameter that is, for example, twice or more of a diameter (for example, eight to 16 mm) of a sphere of a conventional circulating ball screw, a load capacity of the sphere is increased to be equal to or larger than a diameter ratio. Therefore, the number of the spheres can be a very small number (for example, three or more) compared with a conventional circulating ball screw, thereby making it possible to provide a compact, lightweight, and inexpensive ball screw mechanism.

In this case, if a hollow structure is adopted as a screw shaft, for example, a drive shaft of another drive mechanism such as a robot can pass through a through-hole of the screw shaft, thereby making it possible to obtain a more compact device configuration.

Furthermore, if a plurality of the power transmission mechanisms is included, and a distance in a direction of the screw shaft between a pair of corresponding spheres of the power transmission mechanisms is set to be a value obtained by subtracting a value corresponding to backlash with thrust from the spheres acting on the screw shaft, from a value equivalent to a number of pitches between the spiral grooves of the screw shaft on which the pair of spheres is arranged, backlash can be easily reduced (or zero including a preload) by subjecting simple machining to the housing, for example.

BRIEF DESCRIPTION OF DRAWINGS

FIG. 1A is a front partial cross-sectional view illustrating an overall configuration of a ball screw mechanism according to an embodiment of the present invention; FIG. 1B is a side partial cross-sectional view illustrating the overall configuration of the ball screw mechanism; FIG. 1C is a front partial cross-sectional view illustrating a configuration of a ball bearing of the ball screw mechanism; and FIG. 1D is an explanatory view illustrating a dimensional relationship of the ball screw mechanism.

FIG. 2A is a front partial cross-sectional view illustrating an overall configuration according to an another embodiment of the present invention; and FIG. 2B is a side partial cross-sectional view illustrating the overall configuration according to the embodiment.

FIG. 10A is a front partial cross-sectional view illustrating an overall configuration according to an another embodiment of the present invention; and FIG. 10B is a side partial cross-sectional view illustrating the overall configuration according to the embodiment.

FIG. 13A is a side view illustrating a configuration of the linear motion mechanism according to a modification of the embodiment; and FIG. 13B is a front cross-sectional view illustrating the configuration according to the modification.

DESCRIPTION OF EMBODIMENTS

Figure 3:
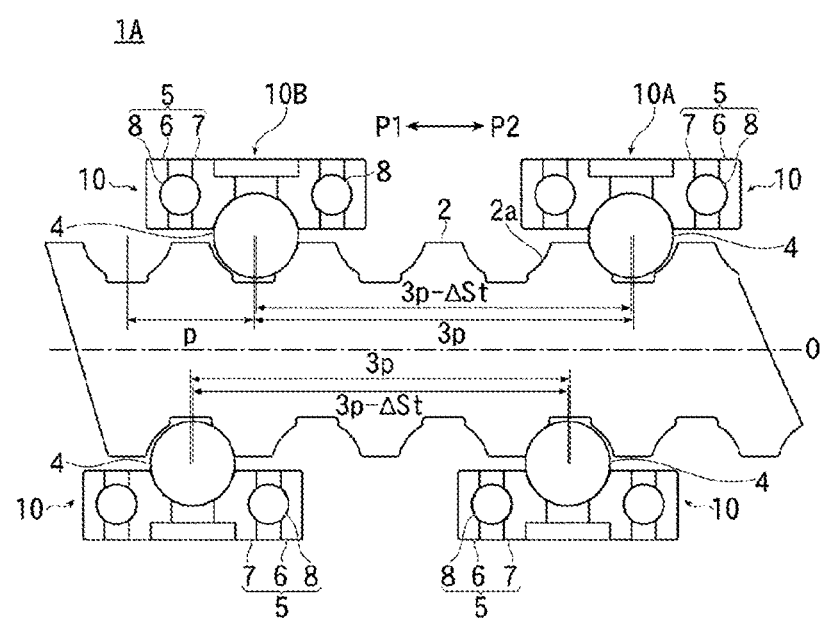
FIG. 3 is an explanatory view illustrating a dimensional relationship of a ball screw according to the present embodiment.

Hereinafter, embodiments of the present invention will be described in detail with reference to the drawings.

FIGS. 1A to 1D illustrate a ball screw according to a first embodiment of the present invention. FIG. 1A is a front partial cross-sectional view illustrating an overall configuration, FIG. 1B is a side partial cross-sectional view illustrating the overall configuration, FIG. 1C is a front partial cross-sectional view and a plan view illustrating a configuration of a ball bearing, and FIG. 1D is an explanatory view illustrating a dimensional relationship between a screw shaft and a sphere.

As illustrated in FIG. 1A, a ball screw mechanism 1 according to the present embodiment includes a screw shaft 2 extending linearly, a moving body 3 provided around the screw shaft 2, and a power transmission mechanism 10 that transmits thrust of the screw shaft 2 to the moving body 3 and moves the moving body 3 along the screw shaft 2.

The screw shaft 2 according to the present embodiment has a solid structure and can be made of a material similar to one of a general screw shaft.

The screw shaft 2 is driven to rotate about a rotation axis O by a motor (not illustrated), and a spiral groove 2a having a Gothic arch shape is formed at regular intervals.

The moving body 3 includes a housing 30 made of, for example, a cuboid member, and a through-hole 3a with an inner diameter slightly larger than that of the screw shaft 2 is formed in a central portion of the housing 30. The screw shaft 2 described above is disposed so as to pass through the through-hole 3a.

As illustrated in FIG. 11 to be referred to later, for example, a table 42 is attached above the housing 30, and the table 42 is fixed on top of a pair of moving blocks 44 mounted on a pair of guide rails 43 of a linear motion mechanism 45. As a result, the housing 30 does not rotate around the rotation axis O even when the screw shaft 2 is driven around the rotation axis O.

In other words, similarly to a conventional circulating ball screw, the moving body 3 of the present invention moves in a direction identical to one of a sphere 4 by movement of the sphere 4 in a first direction P1 or a second direction P2 with the rotation of the screw shaft 2.

The housing 30 according to the present embodiment may be made of a light alloy having high strength.

Examples of such a light alloy include an aluminum (Al) alloy, a zinc (Zn) alloy, and a titanium (Ti) alloy.

In addition, for example, an engineering resin such as a polyacetal resin can be used as a material of the housing 30 depending on applications.

The power transmission mechanism 10 according to the present embodiment includes a plurality of ball bearings 5 and a plurality of spheres 4 corresponding to the respective ball bearings 5.

Here, similarly to a general circulating ball screw, steel balls can be used for the spheres 4. Spheres made of ceramics can also be used.

In the case of the present invention, the spheres 4 are larger in diameter than balls 8 of the ball bearings 5, described later.

On the other hand, in the present embodiment, as illustrated in FIGS. 1A and 1B, four of the ball bearings 5 are attached to the housing 30 of the moving body 3.

In this case, the ball bearings 5 are arranged, each with one side surface thereof facing the screw shaft 2, at regular intervals along the spiral groove 2a of the screw shaft 2.

Each of the ball bearings 5 has a basic configuration equivalent to one of a general deep groove ball bearing, and includes an inner ring 6, an outer ring 7, and the balls 8 in contact with the inner ring 6 and the outer ring 7 (see FIG. 1C).

Similarly to a deep groove ball bearing and an angular ball bearing, the ball bearing 5 has a structure in which the inner ring 6 does not easily come out and move to an anti-load side with respect to an axial load (load in an axial direction).

The ball bearings 5 are arranged so as to be rotatable about their respective rotation axes $N_1$ to $N_4$, extending in a direction orthogonal to the rotation axis O of the screw shaft 2.

Here, each of the ball bearings 5 is inserted into a hole portion 50 provided in the housing 30 to have an outer peripheral surface of the outer ring 7 be fixed to the moving body 3 by a fixing screw 9, and is configured to allow the inner ring 6 to rotate about the rotation axes $N_1$ to $N_4$ in the direction orthogonal to the rotation axis O of the screw shaft 2.

In the case of the present invention, the sphere 4 has a diameter considerably larger than that of the ball 8 of the ball bearing 5.

This is to provide a more compact and practical device by equalizing load balance between the sphere 4 and the ball bearing 5.

In other words, in the present embodiment, as will be described later, the thrust generated by a driving torque (torque given from a driving source) of the screw shaft 2 presses the sphere 4, and a frictional force generated at a contact portion between the sphere 4 and a contact surface 5a of the inner ring 6 of the ball bearing 5 rotates the inner ring 6 of the ball bearing 5, and the ball 8 inside the ball bearing 5 also rotates.

In the present invention, smooth power transmission can be realized by using a ball with a diameter having a smaller inertia force for the ball 8 of the ball bearing 5.

In other words, if a ball having a diameter identical to that of the sphere 4 is used as the ball 8 of the ball bearing 5, at least six or more balls 8 are to be arranged between the inner ring 6 and the outer ring 7 of the ball bearing 5, that is, a frictional force required for acceleration between the sphere 4 and the inner ring 6 simultaneously requires a frictional force to accelerate an object having a mass six times a mass of the sphere 4. Since it is practically impossible to apply such a large frictional force, the ball 8 cannot follow acceleration/deceleration of the ball screw mechanism 1 due to slip from the inner ring 6.

Such a slip operation of the ball bearing causes wear, vibration, heat generation, and the like, which is fatal to a position measuring device and a machine tool and is not practical.

On the other hand, equalization of the load balance between the sphere 4 and the ball bearing 5 makes it possible to provide the ball screw mechanism 1 that is more compact and highly practical.

For example, basic dynamic axial load ratings of the sphere 4 and the ball bearing 5 may be set at equivalent values, and thrust of the ball screw mechanism 1 may be set according to the smaller value.

In the present invention, a diameter of the sphere 4 is not particularly limited, but from a viewpoint of improving practicality, it is preferred to use a sphere having a diameter that is twice or more and four times or less the diameter of the ball 8 of the ball bearing 5.

Specifically, when the diameter of the ball 8 of the ball bearing 5 is four mm, it is preferred to use the sphere 4 having a diameter of eight to 16 mm.

In the present embodiment, the contact surface 5a inscribed in each sphere 4 is provided on one side surface of the inner ring 6 of the ball bearing 5 (see FIG. 1C).

The contact surface 5a is formed of a ring-shaped concave spherical surface and is formed in a Gothic arch shape.

The spheres 4 are arranged, each in contact with the contact surface 5a of each ball bearing 5, at regular intervals adjacent to each other in the spiral groove 2a of the screw shaft 2.

With such a configuration, in each ball bearing 5, the inner ring 6 can freely rotate about the rotation axes $N_1$ to $N_4$ with respect to the outer ring 7.

When the screw shaft 2 rotates, each sphere 4 can rotate (roll on the spiral groove 2a) in various directions while being held by the spiral groove 2a and the contact surface 5a of the inner ring 6 of the ball bearing 5.

In the case of the present invention, a contact angle $\alpha_1$ at which a surface of each sphere 4 and the spiral groove 2a of the screw shaft 2 are in contact with each other when thrust is applied from the sphere 4 to the screw shaft 2 is suitably 45 to 55 degrees as with a general circulating ball screw (see FIG. 1D).

In addition, the spiral groove 2a of the screw shaft 2 is arranged with a gap $\Delta Sp_1$ (for example, 0.5 mm to one mm) with the sphere 4 so that interference with the sphere 4 can be prevented to absorb a pitch error and an attachment error, thereby machining of each sphere 4 so as to be movable in an axial direction of the screw shaft 2.

The reason for this is to prevent the sphere 4 from simultaneously coming into contact with the front and the rear screw surfaces of the spiral groove 2a in the axial direction due to an influence of a radial load or the like.

Additionally, in a bottom portion of the spiral groove 2a, a groove bottom portion 2b for avoiding contact with the sphere 4 is formed.

On the other hand, in the case of the present invention, a contact angle $\alpha_2$ between the surface of each sphere 4 and the contact surface 5a of the ball bearing 5 when a force from the sphere 4 acts on the screw shaft 2 is suitably 45 to 55 degrees as with a general circulation ball screw.

In the case of the present invention, although not particularly limited, from a viewpoint of allowing the sphere 4 inscribed in the contact surface 5a to freely roll on the contact surface 5a, it is preferred to set the diameter of the sphere 4 and a curvature radius of the contact surface 5a such that a gap $\Delta Sp_2$ between the sphere 4 and the contact surface 5a is, for example, 0.01 to 0.5 mm (see FIG. 1C).

In other words, by setting the diameter of the sphere 4 and the curvature radius of the concave spherical surface of the contact surface 5a such that the gap $\Delta Sp_2$ between the sphere 4 and the contact surface 5a of the ball bearing 5 becomes 0.01 to 0.5 mm, a contact area between the sphere 4 and the contact surface 5a increases, and an allowable surface pressure increases.

The other side surface of the inner ring 6 of the ball bearing 5 according to the present embodiment is provided with a sphere lubricating hole 5b for supplying lubricating oil (grease) in order to reduce a friction between the sphere 4 and the ball bearing 5 during operation.

A screw hole 90 having a diameter slightly larger than the diameter of the ball bearing 5 is provided in a portion on an outer side of the screw shaft 2 with respect to each ball bearing 5, and the fixing screw 9 is screwed to the screw hole 90 (see FIG. 1B).

As the fixing screw 9, for example, a hexagon socket set screw can be used.

In the present specification, the sphere 4, the ball bearing 5, and the fixing screw 9 described above are referred to as a sphere unit 11 as one member assembly.

The ball screw mechanism of the present invention includes at least three or more (four in the present embodiment) sphere units 11.

In the present embodiment having such a configuration, for example, when a drive motor 60 illustrated in FIG. 11 is driven to rotationally drive the screw shaft 2 around the rotation axis O, the spiral groove 2a thereof moves in a spiral shape along a track of a lead and advances in, for example, the first direction P1. A surface of each sphere 4 on a side of the second direction P2 and on a side of the screw shaft 2 is in contact with the spiral groove 2a of the screw shaft 2 in a small elliptical area, and receives a thrust component in a direction of the first direction P1 from the spiral groove 2a of the screw shaft 2.

Due to this thrust component, each sphere 4 intersects on an axis in a direction inclined by the contact angle $\alpha_1$ with respect to a direction orthogonal to the rotation axis O of the screw shaft 2 (see FIG. 1D).

Then, by thrusts and rotational torques generated at a contact portion between the spiral groove 2a of the screw shaft 2 and the surface of the sphere 4 and the contact portion between the contact surface 5a of the inner ring 6 of the ball bearing 5 and the surface of the sphere 4, the sphere 4 is pushed to roll on the spiral groove 2a of the screw shaft 2.

Further, when the sphere 4 advances in the first direction P1, the surface of the sphere 4 on a side of the first direction P1 and on a side of the ball bearing 5 comes into contact with the contact surface 5a of the ball bearing 5 in a small elliptical area and, thus, receives the thrust component in the direction of the first direction P1 from the surface of the sphere 4.

A frictional force generated at this time against the contact surface 5a of the inner ring 6 of the ball bearing 5 causes the inner ring 6 of each ball bearing 5 to rotate about the rotation axes $N_1$ to $N_4$, and the spiral groove 2a of the screw shaft 2 to advance in the direction of the first direction P1 on a principle of a screw, thereby causing the outer ring 7 of the ball bearing 5 to receive the thrust component in the first direction P1 via the ball 8.

As described above, in the present embodiment, the thrust in the first direction P1 of the screw shaft 2 is transmitted to the housing 30 of the moving body 3 via the power transmission mechanism 10 (sphere 4 and ball bearing 5), thereby moving the moving body 3 toward the first direction P1.

Note that, when moving the moving body 3 in the second direction P2 opposite to the first direction P1, an operation opposite to the above-described operation may be performed.

The present embodiment described above does not have a mechanism for returning and circulating a sphere such as a conventional circulating ball screw, and thus, it is possible to ensure smooth movement of a sphere without occurrence of ball jam or the like on a screw shaft when a sphere returns, which has occurred in a conventional circulating ball screw.

Further, in the present invention, since the spheres 4 are arranged, each in contact with the contact surface 5a of the inner ring 6 of the ball bearing 5, at regular intervals adjacent to each other in the spiral groove 2a of the screw shaft 2, the spheres 4 do not come into contact with each other on the screw shaft 2.

As a result, according to the present embodiment, it is possible to prevent vibration and noise caused by contact between the spheres that has occurred in a conventional circulating ball screw, avoid an increase in heat, and suppress a power transmission loss during operation caused by the contact between the spheres on the screw shaft, so that power transmission efficiency can be improved.

Furthermore, in the present embodiment, for example, three or more of the ball bearings 5 and the spheres 4 can be provided per lead of the screw shaft 2. This means that, if using terms of a conventional circulating ball screw, the number of turns of the sphere 4 on the screw shaft 2 can be one turn.

As a result, according to the present embodiment, since the number of turns of the sphere 4 can be reduced, an accumulated pitch error generated in a conventional circulating ball screw can be reduced, and a load sharing ratio of the sphere 4 can be prevented from being biased.

In addition, in the present embodiment, by using a sphere having a large diameter that is, for example, twice or more a diameter (for example, eight to 16 mm) of a sphere of a conventional circulating ball screw, a load capacity of the sphere is increased to be equal to or larger than a diameter ratio. Therefore, the spheres 4 can be very small in number (for example, three or more) compared with a conventional circulating ball screw.

For example, when a dynamic load rating of a circulating ball screw having a nominal diameter of 25 mm, a sphere diameter of 4.762 mm, a lead angle of 10.6 degrees, and a number of turns of a sphere of two is compared with a dynamic load rating of the ball screw mechanism according to the present embodiment in which four spheres having a diameter of 10 mm are arranged at an equal pitch, the present embodiment in which four spheres are arranged is rather slightly larger.

This means that, in the ball screw mechanism 1 according to the present embodiment, the dynamic load rating is equivalent to 34 spheres, which is twice the number of 17 spheres per turn, and this shows that effects of the sphere diameter ratio are large.

According to the embodiment described above, it is possible to provide the ball screw mechanism 1 that is compact, lightweight, and inexpensive.

FIG. 2A is a front partial cross-sectional view illustrating an overall configuration according to a second embodiment of the present invention.

Hereinafter, sections corresponding to those of the first embodiment are denoted by identical reference numerals, and a detailed description thereof will be omitted.

As illustrated in FIG. 2A, a ball screw mechanism 1A according to the second embodiment has a plurality of (two in the second embodiment) power transmission mechanisms (first and second power transmission mechanisms 10A and 10B) provided in the housing 30.

Each of the first and the second power transmission mechanisms 10A and 10B has a configuration equivalent to that of the power transmission mechanism 10 described above, and includes a plurality of (four in the second embodiment) sphere units 11 (see FIG. 2B).

In the case of the second embodiment, the first power transmission mechanism 10A applies thrust in the first direction P1 parallel to the rotation axis O of the screw shaft 2 to the moving body 3, while the second power transmission mechanism 10B applies thrust in the second direction P2 opposite to the first direction to the moving body 3 (see FIG. 2A).

In this case, the first direction P1 is, for example, a direction of moving from a home position to a target position, and the second direction P2 is a direction of moving from the target position to the home position.

Figure 4A:
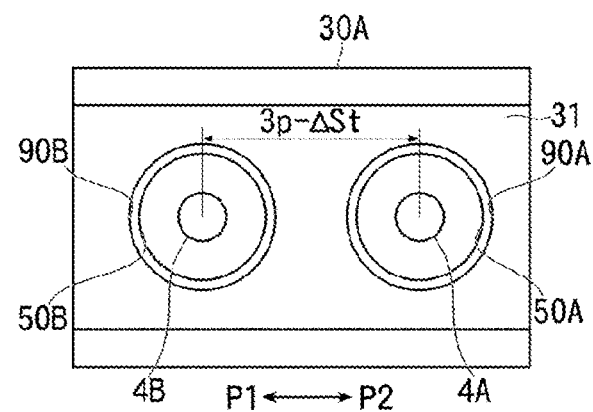
FIG. 4A is an explanatory view illustrating a distance between holes of a housing of a moving body according to the present embodiment.
Figure 4B:
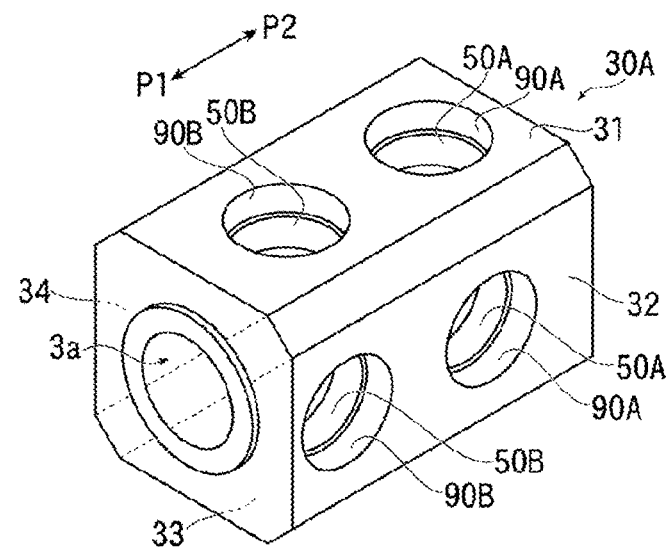
FIG. 4B is a perspective view illustrating the housing of the moving body.

FIG. 3 is an explanatory view illustrating a dimensional relationship of the ball screw mechanism according to the second embodiment, FIG. 4A is an explanatory view illustrating a distance between holes of a housing of a moving body according to the second embodiment, and FIG. 4B is a perspective view illustrating the housing of the moving body.

As illustrated in FIG. 3, in the second embodiment, a distance in a direction of the screw shaft 2 between a pair of spheres 4 corresponding to the first and the second power transmission mechanisms 10A and 10B described above is set to be a value obtained by subtracting a value ΔSt corresponding to backlash with thrusts from the spheres 4 acting on the screw shaft 2, from a pitch 3p, which is a distance between the spiral grooves 2a of the screw shaft 2 in which the pair of spheres 4 is arranged, that is, $3p-\Delta St$.

In the present invention, for example, as illustrated in FIGS. 4A and 4B, hole portions 50A and 50B and screw holes 90A and 90B equivalent to the hole portion 50 and the screw hole 90 described above are provided on each of side surfaces 31 to 34 of the housing 30 of the moving body 3 at a distance of $3p-\Delta St$ described above, and the sphere unit 11 (sphere 4, ball bearing 5, and fixing screw 9) illustrated in FIG. 2A is attached to each of the hole portions 50A and 50B and the screw holes 90A and 90B, thereby enabling the configuration illustrated in FIG. 3.

Meanwhile, in the first embodiment, as described above, a groove width of the spiral groove 2a of the screw shaft 2 has a predetermined gap $\Delta Sp_1$ with the surface of the sphere 4 in order to prevent interference with the sphere 4 (see FIG. 1D).

On the other hand, on the concave spherical surface 5a of the ball bearing 5, a slight gap $\Delta Sp_2$ smaller than the gap $\Delta Sp_1$ is provided between the ball bearing 5 and the sphere 4 (see FIG. 1C).

When these gaps $\Delta Sp_1$ and $\Delta Sp_2$ are summed, there is a play of $\Delta Sp = \Delta Sp_1 + \Delta Sp_2$ between the screw shaft 2 and the housing 30 of the moving body 3.

Conventionally, some devices using a circulating ball screw are controlled by a machine tool or a servo motor, and there is a case where it is required to eliminate the play $\Delta Sp$ to zero.

In this case, in a general circulating ball screw, a double nut system is adopted to reduce a distance between the nuts by an amount of play.

The reason why two nuts are provided is that it is necessary to carve spiral grooves at regular intervals on an inner surface of a nut of a bearing steel, and it is not easy to change a pitch of the spiral grooves from a middle (although complicated, some devices have measures to use a double-thread screw with a pitch shifted).

On the other hand, in the case of the present invention, one housing 30 is provided with a required number of the hole portions 50A and the screw holes 90A on a track of a lead that receives a load in a normal rotation direction, and the sphere unit 11 constituted by the sphere 4, the ball bearing 5, and the fixing screw 9 is assembled, which is set as the power transmission mechanism 10A.

Next, in an identical housing 30, a required number of the hole portions 50B and the screw holes 90B are provided on the track of the lead that receives a load in a reverse rotation direction, and the above-described sphere unit 11 is assembled, which is set as the power transmission mechanism 10B.

Since a reference distance between the two power transmission mechanisms 10A and 10B is an integral multiple of a pitch p and is three times the pitch p in the case of the example illustrated in FIG. 3, the play between the screw shaft 2 and the housing 30 of the moving body 3 can be eliminated to be zero by making a distance between a center point of the hole portion 50A and the screw hole 90A of the power transmission mechanism 10A and a center point of the hole portion 50B and the screw hole 90B of the power transmission mechanism 10B $3P-\Delta St$, that is, making a distance between the corresponding holes close to each other by the gap $\Delta St$ described above.

In addition, the play between the screw shaft 2 and the housing 30 of the moving body 3 can be made negative for a purpose of giving a preload.

According to the second embodiment, since the hole portion 50A and the screw hole 90A may be arranged by shifting one power transmission mechanism 10A toward the other power transmission mechanism 10B by the backlash amount $\Delta St$ calculated by the above equation, machining can be easily performed, and cost performance is good.

Figures 5A, 5B:
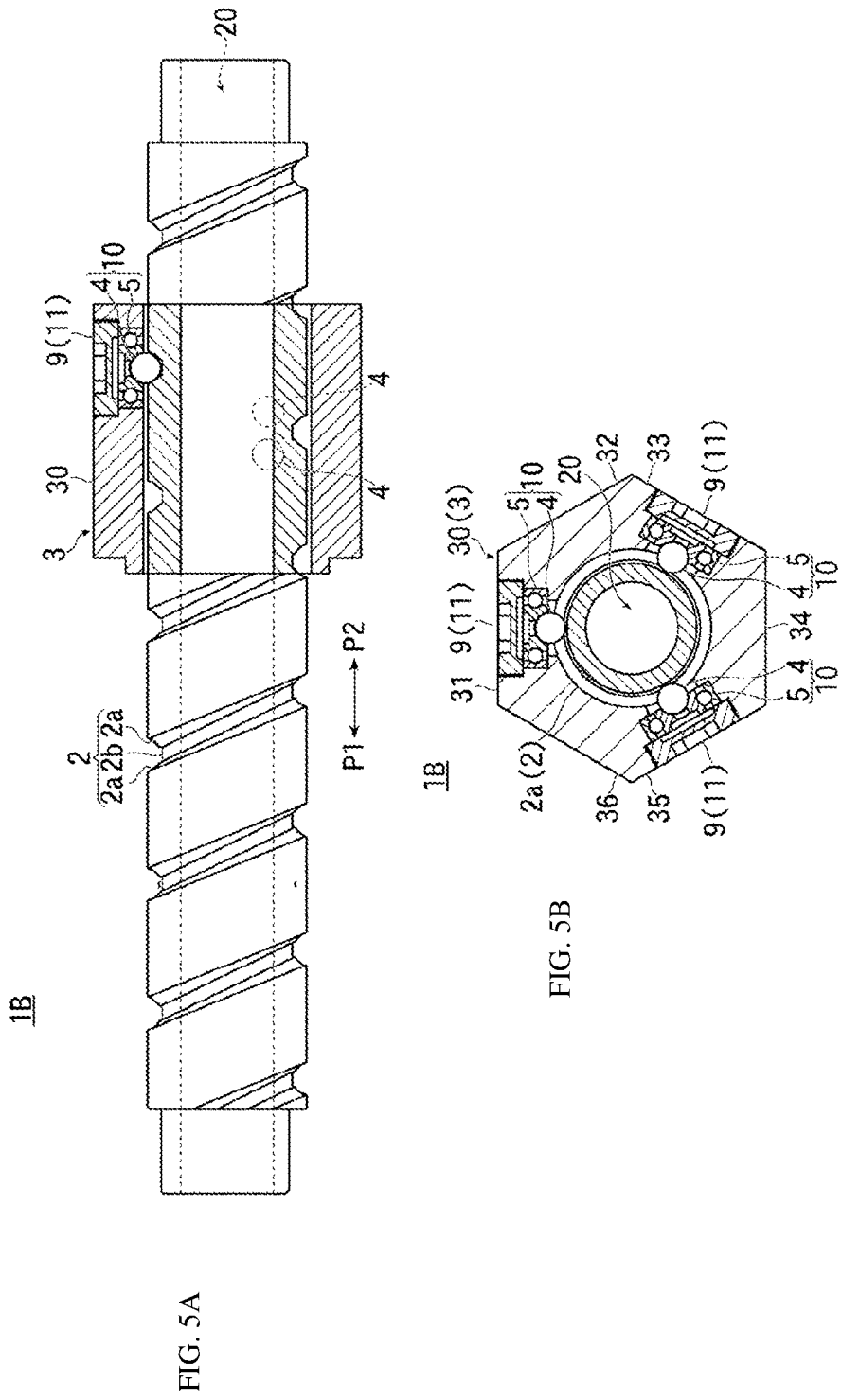
FIG. 5A is a front partial cross-sectional view illustrating an overall configuration with a screw shaft with a hollow structure according to an another embodiment of the present invention.
FIG. 5B is a side partial cross-sectional view illustrating the overall configuration according to the embodiment.

FIG. 5A is a front partial cross-sectional view illustrating an overall configuration according to a third embodiment of the present invention, and FIG. 5B is a side partial cross-sectional view illustrating the overall configuration according to the third embodiment.

Figure 6:
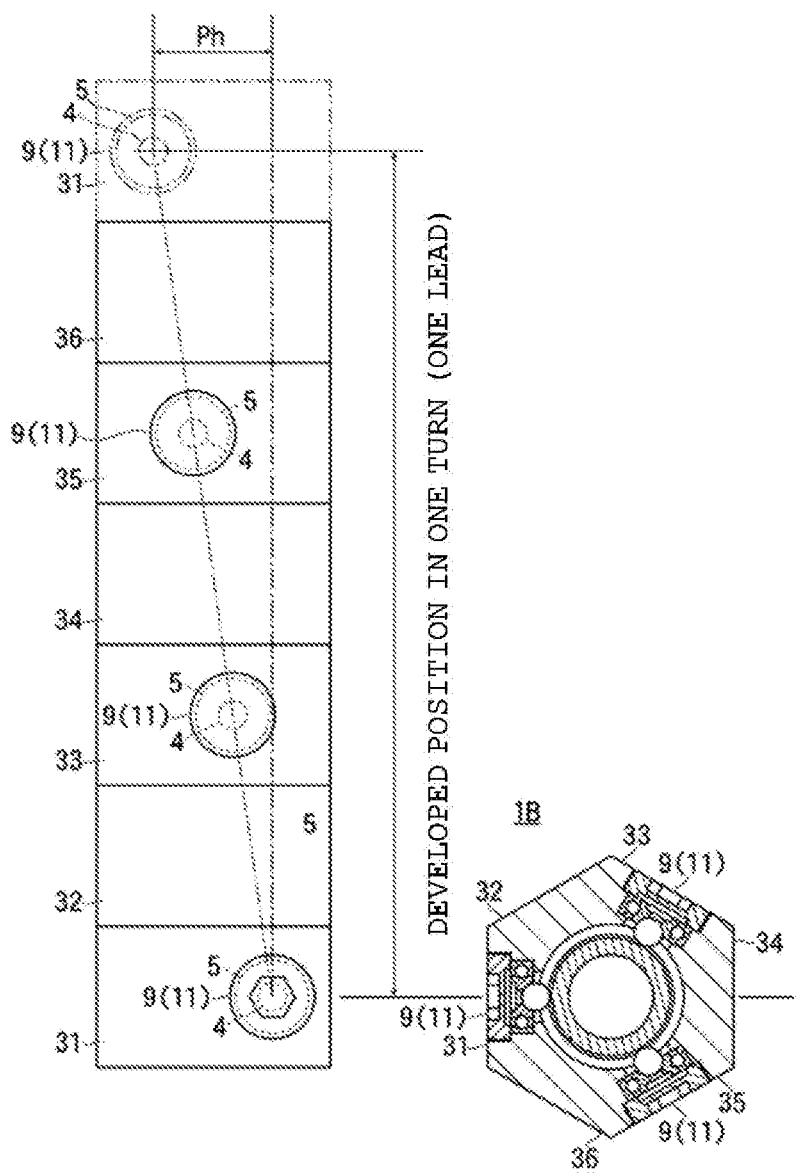
FIG. 6 is a developed explanatory view illustrating arrangement of sphere units per lead according to the present embodiment.

FIG. 6 is a developed explanatory view illustrating arrangement of sphere units per lead according to the third embodiment.

Hereinafter, sections corresponding to those of the first embodiment are denoted by identical reference numerals, and a detailed description thereof will be omitted.

As illustrated in FIGS. 5A and 5B, a ball screw mechanism 1B according to the third embodiment has the screw shaft 2 with a hollow structure. In other words, a through-hole 20 extending in a longitudinal direction is formed in the screw shaft 2.

In the third embodiment, a cross-section of the housing 30 of the moving body 3 is formed in a regular hexagonal shape, and three sphere units 11 are provided in the housing 30, thereby constituting the power transmission mechanism 10.

In this case, as illustrated in FIG. 6, three sphere units 11 (sphere 4, ball bearing 5, and fixing screw 9) per lead (Ph) are attached at regular intervals along the spiral groove (lead track) 2a of the screw shaft 2.

As the screw shaft 2, a single-threaded screw is used.

Figures 7A, 7B:
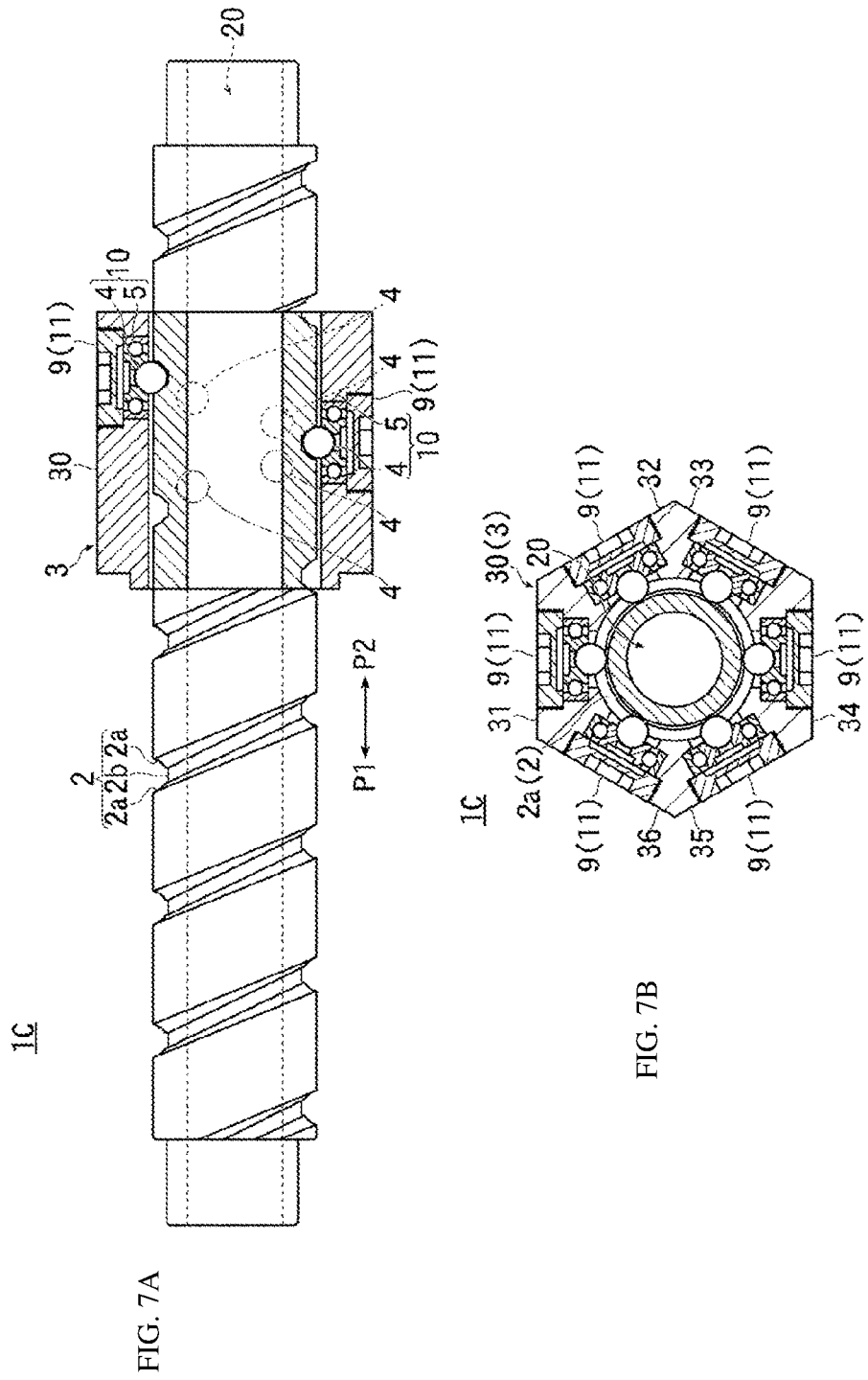
FIG. 7A is a front partial cross-sectional view illustrating an overall configuration according to an another embodiment of the present invention.
FIG. 7B is a side partial cross-sectional view illustrating the overall configuration according to the embodiment.

FIG. 7A is a front partial cross-sectional view illustrating an overall configuration according to a fourth embodiment of the present invention, and FIG. 7B is a side partial cross-sectional view illustrating the overall configuration of the fourth embodiment.

Figure 8:
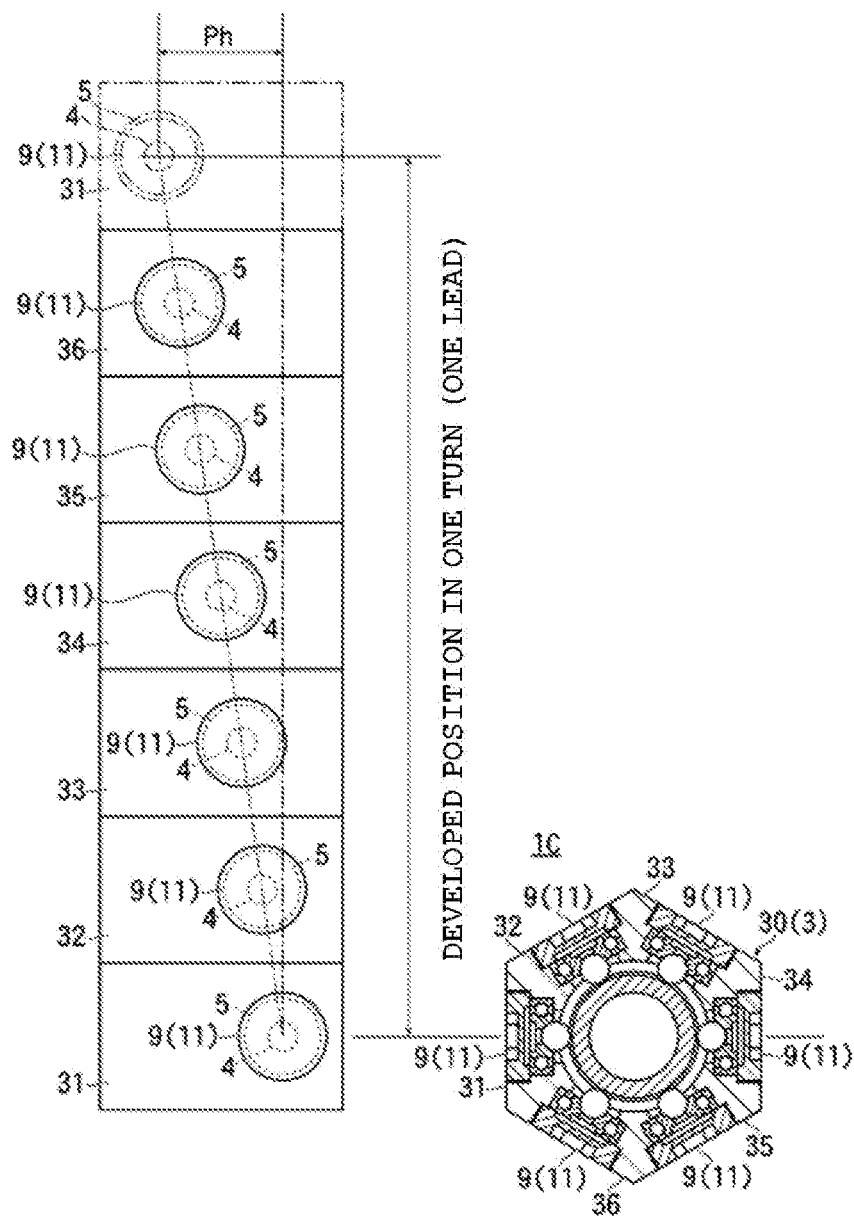
FIG. 8 is a developed explanatory view illustrating arrangement of sphere units per lead according to the present embodiment.
Figure 9:
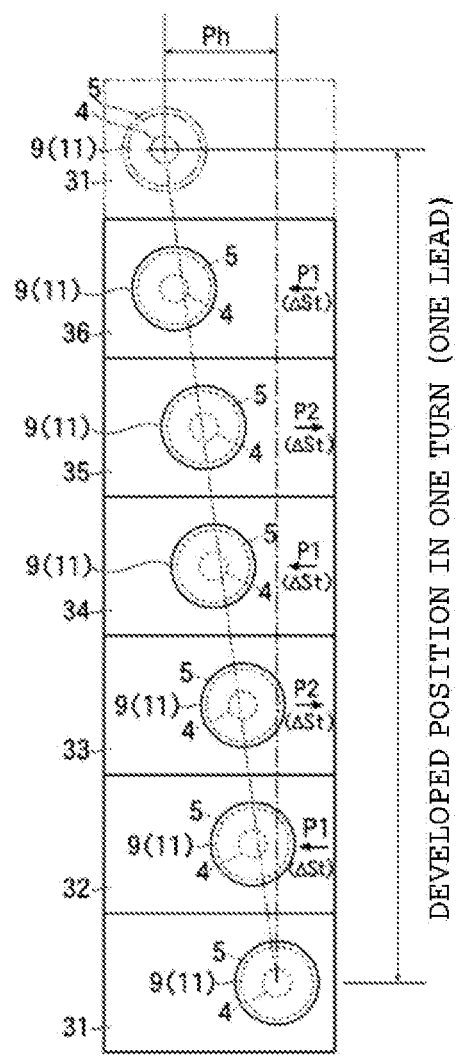
FIG. 9 is a developed explanatory view illustrating a modification according to the embodiment.

FIG. 8 is a developed explanatory view illustrating the arrangement of sphere units per lead according to the fourth embodiment, and FIG. 9 is a developed explanatory view illustrating a modification according to the fourth embodiment.

Hereinafter, sections corresponding to those of the first embodiment are denoted by identical reference numerals, and a detailed description thereof will be omitted.

As illustrated in FIGS. 7A and 7B, a ball screw mechanism 1C according to the fourth embodiment has a screw shaft 2 with a hollow structure, and the through-hole 20 extending in the longitudinal direction is formed in the screw shaft 2.

In the fourth embodiment, the cross-section of the housing 30 of the moving body 3 is formed in a regular hexagonal shape, and six sphere units 11 are provided in the housing 30, thereby constituting the power transmission mechanism 10.

In this case, six sphere units 11 (sphere 4, ball bearing 5, and fixing screw 9) are attached at regular intervals per lead along the spiral groove (lead track) 2a of the screw shaft 2.

As the screw shaft 2, a single-threaded screw is used.

According to the embodiments illustrated in FIGS. 5A and 5B to FIG. 8 and FIG. 10, since the screw shaft 2 with a hollow structure is provided, a drive shaft of another drive mechanism such as a robot can be passed through the through-hole 20 of the screw shaft 2, thereby making it possible to obtain a compact device configuration.

According to those embodiments, a sphere unit can be installed anywhere without a return mechanism of a conventional circulating ball screw, which is technically difficult, and thus the sphere unit 11 can be easily arranged and attached to the housing 30 even with the hollow screw shaft 2 having an arbitrary thickness.

For example, in a fifth embodiment illustrated in FIG. 10, since the screw shaft 2 is considerably thick (for example, a shaft diameter is about 82 mm), an allowable thrust is about ⅕ of one of a general circulating ball screw (the number of turns: 3), but an axial length is ½. Therefore, design options can be widened.

In general, a driving torque and a thrust increase as a shaft diameter of a circulating ball screw increases, but a driving torque may be small depending on applications even when a shaft diameter is increased, and when a driving torque and a thrust are increased according to a shaft diameter, excessive quality is likely to occur.

In particular, in a case of a long screw shaft, the shaft diameter may be increased in order to prevent buckling and critical speeds. In such a case, a hollow screw shaft can increase shape effects against buckling, and it is easy to suppress deflection for critical speeds, so that an effective response can be made. In addition, reduction in weight is advantageous in terms of compactness and effectiveness in environmental load.

More specifically, since a driving torque and a thrust do not increase or decrease in proportion to a shaft diameter of a screw shaft, a driving torque and a thrust can be adjusted, in the present invention, by changing the number of sphere units per lead.

FIGS. 7A and 7B illustrate an example in which the number of sphere units 11 according to the third embodiment illustrated in FIG. 5 is doubled (3→6) to double a driving torque.

On the other hand, at this time, backlash can be reduced without doubling a driving torque. As described with reference to FIG. 3, this is possible by dividing, in the power transmission mechanisms 10A and 10B, the arrangement of the spheres 4 into a normal rotation side and a reverse rotation side and shifting either one by ΔSt in the axial direction of the screw shaft 2.

Further, for example, as illustrated in FIG. 9, adjacent sphere units 11 can be arranged in a staggered manner shifted by a predetermined distance (here, ΔSt) in the axial direction of the screw shaft 2 (the first direction P1 or the second direction P2).

In particular, if all the sphere units 11 can be arranged in a 360-degree rotation about the screw shaft 2, for example, as illustrated in FIGS. 7A and 7B, when viewed from a direction orthogonal to the direction of the screw shaft 2, there is no overlap between the sphere units 11, and a thrust load to each of the spheres 4 and the ball bearings 5 based on a thrust to the moving body 3 is evenly distributed to these, so that a fatigue strength can be improved.

The present example with such a configuration allows for weight reduction, compactness, easy manufacturing, and design optimization of a device.

FIG. 10A is a front partial cross-sectional view illustrating an overall configuration according to the fifth embodiment of the present invention, and FIG. 10B is a side partial cross-sectional view illustrating the overall configuration according to the embodiment.

Hereinafter, sections corresponding to those of the first embodiment are denoted by identical reference numerals, and a detailed description thereof will be omitted.

As illustrated in FIGS. 10A and 10B, a ball screw mechanism 1D according to the fifth embodiment has the screw shaft 2 with a hollow structure, and the through-hole 20 extending in the longitudinal direction is formed in the screw shaft 2.

In the fifth embodiment, the housing 30 of the moving body 3 is formed in a cylindrical cross-sectional shape, and eight sphere units 11 are provided in the housing 30, which constitutes the power transmission mechanism 10.

In this case, although not illustrated in detail, eight sphere units 11 (sphere 4, ball bearing 5, and fixing screw 9) per lead are attached at regular intervals along the spiral groove (lead track) 2a of the screw shaft 2.

As the screw shaft 2, a single-threaded screw is used.

According to the fifth embodiment with such a configuration, as described above, when viewed from the direction orthogonal to the direction of the screw shaft 2, there is no overlap between the sphere units 11, and an axial load to each of the spheres 4 and the ball bearings 5 based on the thrust to the moving body 3 is evenly distributed to these, so that the fatigue strength can be improved.

In addition, in the fifth embodiment, since more sphere units 11 can be provided in 360 degrees (one lead) in the housing 30 of the moving body 3, a shared load on the spheres 4 of the sphere units 11 can be evened out among the spheres 4, and power transmission efficiency from the screw shaft 2 to the moving body 3 can be improved as compared with a circulating ball screw.

Figures 11A, 11B:
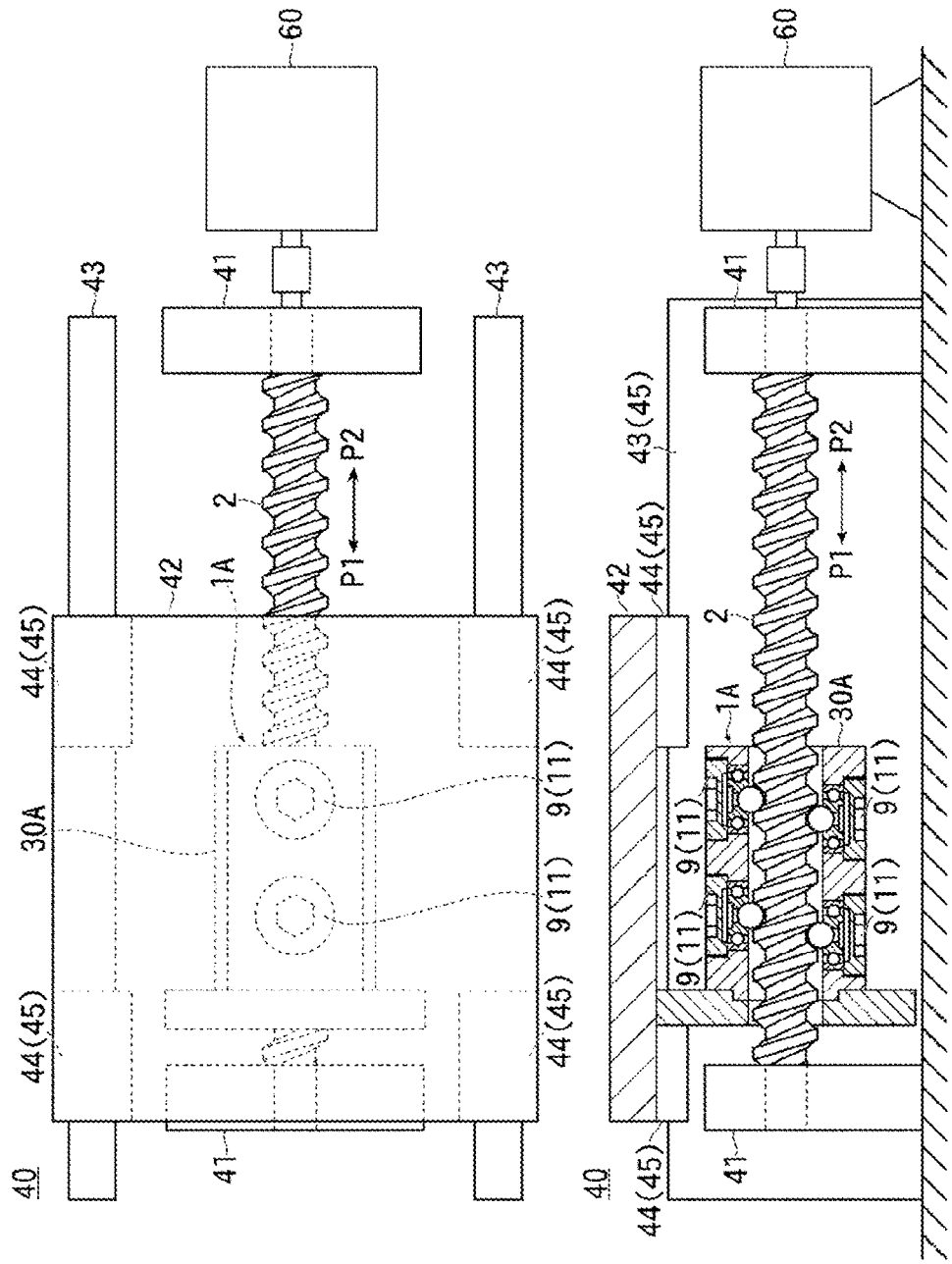
FIG. 11A is a plan view illustrating a main part of a linear moving device according to the present embodiment.
FIG. 11B is a longitudinal partial cross-sectional view illustrating the main part of the linear moving device.

FIGS. 11A and 11B are views illustrating a main part of a linear moving device according to the fifth embodiment, where FIG. 11A is a plan view and FIG. 11B is a longitudinal partial cross-sectional view.

As illustrated in FIGS. 11A and 11B, a linear moving device 40 according to the fifth embodiment includes, for example, the ball screw mechanism 1A illustrated in FIGS. 2A and 2B.

Here, the ball screw mechanism 1A has the screw shaft 2 oriented in a horizontal direction and supported by a pair of support blocks 41, and the screw shaft 2 is rotated in forward and reverse directions by the drive motor 60.

The table 42 is fixed on top of the housing 30A of the ball screw mechanism 1A.

The linear motion mechanism 45 is provided on both sides of the ball screw mechanism 1A.

The linear motion mechanism 45 includes the pair of guide rails 43 provided in parallel with the screw shaft 2, and the moving blocks 44 each movable along these guide rails 43.

The table 42 horizontally attached on top of the housing 30A of the ball screw mechanism 1A is fixed on top of the moving blocks 44 of the linear motion mechanism 45.

According to the fifth embodiment with such a configuration, it is possible to provide the linear moving device 40 including the compact, lightweight, and inexpensive ball screw mechanism 1 that can ensure smooth movement of the sphere 4 on the screw shaft 2 to prevent vibration and noise, avoid an increase in heat, and maintain high power transmission efficiency, and that can relatively reduce an accumulated pitch error between the nut portion holding the sphere and the screw shaft by making a number of turns of the sphere 4 on the screw shaft 2 one turn, and further, that can reduce a value of backlash.

Figures 12A, 12B:
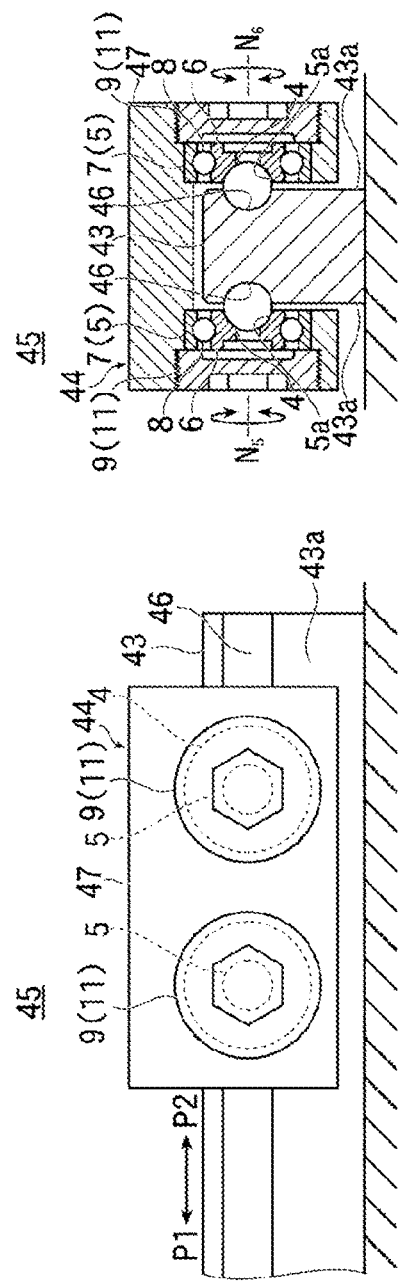
FIG. 12A is a side view illustrating a configuration of a linear motion mechanism according to an embodiment the present invention.
FIG. 12B is a front cross-sectional view illustrating the configuration according to the embodiment.

FIGS. 12A and 12B are views illustrating a configuration of a linear motion mechanism according to an embodiment of the present invention, in which FIG. 12A is a side view and FIG. 12B is a front cross-sectional view.

FIGS. 13A and 13B are views illustrating a configuration of the linear motion mechanism according to a modification of the present embodiment, in which FIG. 13A is a side view and FIG. 13B is a front cross-sectional view.

Hereinafter, sections corresponding to those of the first embodiment are denoted by identical reference numerals, and a detailed description thereof will be omitted.

As illustrated in FIGS. 12A and 12B, the present embodiment uses the linear motion mechanism 45 described below in the linear moving device 40 illustrated in FIGS. 11A and 11B.

Here, the linear motion mechanism 45 includes the guide rail 43 and the moving block 44 that has a housing 47 provided so as to surround the guide rail 43.

The guide rail 43 according to the present embodiment is formed in a rectangular shape in cross-section and provided so as to extend in the horizontal direction.

On both side portions of the guide rail 43, guide grooves 46 formed in an arc or Gothic arch shape in cross-section and extending in the horizontal direction are provided.

On the other hand, in the modification illustrated in FIGS. 13A and 13B, the guide grooves 46 formed in a Gothic arch shape and extending in the horizontal direction are provided on both side portions of the guide rail 43.

In a bottom portion of each of the guide grooves 46, a groove bottom portion 48 is formed in order to avoid contact with the sphere 4 and prevent a contact angle between the sphere 4 and the guide groove 46 from becoming 60 degrees or more.

The housing 47 is formed in a U-shaped cross-section and arranged such that inner portions of both side portions extending in a vertical direction face the guide grooves 46 on both side surfaces 43a of the guide rail 43.

In the present embodiment, two of the ball bearings 5 described above are provided on each side portions of the housing 47.

Here, each of the ball bearings 5 has one side surface thereof facing the guide groove 46 of the guide rail 43, the outer ring 7 is attached and fixed to the housing 47 of the moving block 44 at regular intervals along the guide groove 46, and the inner ring 6 has the concave spherical contact surface 5a that is in contact with each of the spheres 4 formed on a side surface facing the guide rail 43.

Furthermore, in each ball bearing 5, each inner ring 6 is rotatably disposed about rotation axes $N_5$ and $N_6$ in a direction orthogonal to a longitudinal direction of the guide rail 43, and the spheres 4 are arranged, each in contact with the contact surface 5a of the inner ring 6 of the ball bearing 5, at predetermined intervals (here, regular intervals) adjacent to each other in the guide groove 46 of the guide rail 43, thereby causing the housing 47 of the moving block 44 to be supported by the guide groove 46 of the guide rail 43 via the spheres 4.

In the linear motion mechanism 45 with such a configuration according to the present embodiment, when a force is applied to the housing 47 in a direction in which the guide rail 43 extends, a contact force acts on each sphere 4 from the contact surface 5a of the inner ring 6 of the ball bearing 5 via the outer ring 7 and the ball 8 of the ball bearing 5, and a reaction force from a groove surface of the guide groove 46 of the guide rail 43 against the contact force acts on the contact surface 5a of the inner ring 6 of the ball bearing 5 via the sphere 4.

By actions of these forces, each sphere 4 rolls in the guide groove 46 of the guide rail 43, and the moving block 44 moves in the horizontal direction (the first direction P1 or the second direction P2) while the inner ring 6 of each ball bearing 5 rotates about the rotation axes $N_5$ and $N_6$.

With the linear motion mechanism 45 according to the present embodiment as described above, ball jam and contact between spheres when a sphere returns, which have occurred in a conventional linear motion mechanism that circulates a sphere, do not occur, thereby making it possible to ensure smooth movement of a sphere and improve power transmission efficiency.

Thus, when the foregoing linear motion mechanism 45 is applied to the linear moving device 40 illustrated in FIGS. 11A and 11B, smoother traveling is possible.

Note that the present invention is not limited to the above-described embodiments, and various modifications can be made.

For example, the second embodiment illustrated in FIGS. 2A and 2B includes the power transmission mechanisms 10A and 10B that are identical to the power transmission mechanism 10, but the present invention is not limited thereto, and may include, for example, a power transmission mechanism having a different number of sphere units 11.

With such a configuration, it is possible to provide a ball screw mechanism capable of applying an optimum driving torque to the screw shaft 2 according to a direction of movement of the moving body 3.

REFERENCE SIGNS LIST 1 ball screw mechanism
2 screw shaft
3 moving body
4 sphere
5 ball bearing
6 inner ring
7 outer ring
8 ball
9 fixing screw
10 power transmission mechanism
11 sphere unit
20 through-hole
30 housing
40 linear moving device
45 linear motion mechanism

The invention claimed is:

1. A ball screw mechanism comprising:
a screw shaft that includes a spiral groove and extends linearly;
a moving body that includes a housing provided so as to surround a periphery of the screw shaft; and
a power transmission mechanism that transmits a thrust of the screw shaft to the housing of the moving body to move the moving body in an axial direction of the screw shaft, wherein
the power transmission mechanism includes a plurality of ball bearings, a plurality of spheres respectively corresponding to the ball bearings, and a plurality of fixing screws, each of the fixing screws contacting a first side of the respective ball bearings that does not face the screw shaft,
the housing has a plurality of hole portions into which the plurality of ball bearings can be inserted,
the ball bearings each include, with a second side surface facing the screw shaft, an outer ring attached and fixed to the housing of the moving body at regular intervals along the spiral groove of the screw shaft, and an inner ring located inside the outer ring and with a concave spherical contact surface formed on the second side surface facing the screw shaft, the concave spherical contact surface being in contact with the spheres, and balls in contact with the outer ring and the inner ring,
each of the inner rings is rotatably disposed about a rotation axis in a direction orthogonal to a rotation axis of the screw shaft, and the spheres are arranged, each in contact with the concave spherical contact surface, at regular intervals adjacent to each other in the spiral groove of the screw shaft, a bottom of the spiral groove is provided with a groove to avoid contact with the spheres, the balls are sandwiched along the radial direction of the outer ring and the inner ring by being installed in depressions formed opposite each other on an inner peripheral surface of the outer ring and an outer peripheral surface of the inner ring, the outer ring is sandwiched along the rotation axis direction of the inner ring by one of the fixing screws and a bottom of the respective hole portions, and an inner diameter of a side end of the inner ring where the concave spherical contact surface is formed is larger than the diameter of the spheres.

2. The ball screw mechanism according to claim 1, wherein the screw shaft has a hollow structure.

3. The ball screw mechanism according to claim 1, comprising a plurality of the power transmission mechanisms, wherein a distance in a direction of the screw shaft between a pair of corresponding spheres of the power transmission mechanisms is set to be a value obtained by subtracting a value corresponding to a backlash with a thrust from the spheres acting on the screw shaft, from a value equivalent to a number of pitches between the spiral grooves of the screw shaft on which the pair of spheres is arranged.

4. The ball screw mechanism according to claim 1, wherein three or more of the ball bearings and the spheres are provided per lead of the screw shaft.

5. A linear moving device comprising:
the ball screw mechanism according to claim 1;
a pair of support blocks that rotatably supports the screw shaft of the ball screw mechanism;
a table that is attached to the housing of the ball screw mechanism; and
a linear motion mechanism that includes a pair of guide rails arranged in parallel with the screw shaft of the ball screw mechanism and moving blocks attached to the table and mounted on the guide rails to respectively move linearly along the guide rails.

6. The linear moving device according to claim 5, wherein in the linear motion mechanism, the guide rails each have a guide groove extending linearly along the guide rails, and the moving blocks include a housing provided so as to face both side surfaces of the guide rails, the ball bearings each are attached, with one side surface facing the guide groove of the guide rails, to the housing of the moving blocks along the guide groove of the guide rails, and the guide groove has a cross-section formed in an arc shape or a Gothic arch shape, and the ball bearings each include, with the one side surface facing the guide rails, the outer ring attached and fixed to the housing of the moving blocks at regular intervals along the guide groove, and the inner ring with the concave spherical contact surface formed on a side surface facing the guide rails, the concave spherical contact surface being in contact with the spheres, and each of the inner rings is rotatably disposed about a rotation axis in a direction orthogonal to a longitudinal direction of the guide rail and the spheres are arranged, each in contact with the concave spherical contact surface, at predetermined intervals adjacent to each other in the guide groove of the guide rails.

7. The ball screw mechanism according to claim 2, comprising a plurality of the power transmission mechanisms, wherein a distance in a direction of the screw shaft between a pair of corresponding spheres of the power transmission mechanisms is set to be a value obtained by subtracting a value corresponding to a backlash with a thrust from the spheres acting on the screw shaft, from a value equivalent to a number of pitches between the spiral grooves of the screw shaft on which the pair of spheres is arranged.

* * * * *